United States Patent [19]
Foley

[11] 3,971,901
[45] July 27, 1976

[54] COMMUNICATIONS HEADSET WITH REVERSIBLE MOUNTING MEANS

[75] Inventor: James P. Foley, Astoria, N.Y.

[73] Assignee: Roanwell Corporation, New York, N.Y.

[22] Filed: Mar. 5, 1975

[21] Appl. No.: 555,529

[52] U.S. Cl. .............................. 179/156 A
[51] Int. Cl.² ............................ H04M 1/05
[58] Field of Search ............ 179/156 R, 156 A

[56] References Cited
UNITED STATES PATENTS

| | | | |
|---|---|---|---|
| 3,184,556 | 5/1965 | Larkin | 179/156 A |
| 3,327,807 | 6/1967 | Mullin | 179/156 R X |
| 3,796,841 | 3/1974 | Gorman | 179/156 A |

FOREIGN PATENTS OR APPLICATIONS

| | | | |
|---|---|---|---|
| 995,159 | 6/1965 | United Kingdom | 179/156 A |

Primary Examiner—William C. Cooper
Attorney, Agent, or Firm—Cooper, Dunham, Clark, Griffin & Moran

[57] ABSTRACT

This headset includes an earphone and/or a microphone. The headset is mounted on a yoke adapted to fit over a wearer's head with pad means at each end of the yoke for engaging the sides of the wearer's head at areas spaced above the ear. One of the pad means is apertured horizontally to receive a beam which extends in either direction from the pad means, so that that pad means can be placed on the wearer's head with the beam extending forwardly, whether that one pad is on the left or right. A housing is coupled to the forward end of the beam. When the headset includes an earphone, the earphone transducer is in the housing and an ear tube is coupled to the forwardly extending end of the beam and communicates through a hole in the boom with the earphone transducer. The beam is frictionally adjustable longitudinally of an aperture in a casing on the pad means.

20 Claims, 11 Drawing Figures

COMMUNICATIONS HEADSET WITH REVERSIBLE MOUNTING MEANS

CROSS-REFERENCE

The reversible microphone employed in this invention may be that described in the copending application of Lech Poradowski, Ser. No. 592,632, filed July 3, 1975.

BRIEF SUMMARY OF THE INVENTION

A headset according to the invention employs a yoke adapted to fit over the top of the wearer's head and having pad means at each end of the yoke for engaging the sides of the wearer's head at areas spaced above the ears. One of the pad means has an aperture extending horizontally through it from front to back. A beam is insertable in either end of this aperture, and when so inserted is adjustable to project from the aperture by varying amounts. A leaf spring within the aperture holds the beam frictionally against the opposite side of the aperture and maintains the adjustment. The outer projecting end of the beam is provided with two opposed coupling elements. The coupling element on one side of the beam cooperates with a mating element on a transducer housing so as to support that housing on the beam. The other coupling element cooperates with a mating element at one end of an ear tube whose opposite end is fitted with an earpiece for insertion into the wearer's ear. The transducer housing is provided adjacent its lower end with an articulated joint.

In certain embodiments, a microphone is carried at the end of a conduit, and the opposite end of the conduit is connected to the articulated joint. One such embodiment includes wires from the microphone extending through the conduit and the joint to electrical circuit elements within the housing. In that embodiment, the joint includes rotation limiting means to prevent twisting of the wires. In another such embodiment, the joint is freely rotatable and a rotatable connector is provided for the conductors of the microphone circuit.

In another embodiment, a voice transducer is located in the housing and connected through an acoustic tube including an articulated joint to an end of the tube adjacent the wearer's mouth.

The headset may be mounted on the wearer's head with the one pad means that carries the beam either on the right or left side of the head. The beam should be inserted in that pad means so that it projects forwardly therefrom, with the microphone or voice tube adjacent the wearer's mouth and the earpiece adjacent the wearer's ear for ready insertion therein.

DETAILED DESCRIPTION FIGS. 1–10

A headset according to the invention includes a yoke 1, best seen in FIGS. 1, 2, 6 and 7, adapted to fit over a wearer's head and two pad means 2 and 3 at the opposite ends of the yoke. The pad means 2 comprises a resilient pad 4 of sponge rubber or the like fixed to a plate 5 which is pivoted at 6 to a casing 7 attached by any suitable means to an end of the yoke 1.

The pad means 3 comprises a resilient pad 8 (FIGS. 1, 4, 6 and 7) of sponge rubber or the like fixed to a plate 10. The plate 10 is attached to a casing 11 which is connected by any suitable means to the other end of the yoke 1.

The casing 11 is provided with an aperture 11a (FIGS. 2–5) extending from front to rear of the casing, and defined by a channel closed at its open side by a block 12 (FIGS. 4 and 5), which may be bonded in place on the casing 11. Before bonding the block 12 to the casing 11, an elongated leaf spring 13 having bent over ends 13d is inserted in the channel with its ends in apertures 12a in the block, so that after the block 12 is bonded in place, the leaf spring 13 is captured in the aperture 11a.

Figure 5:
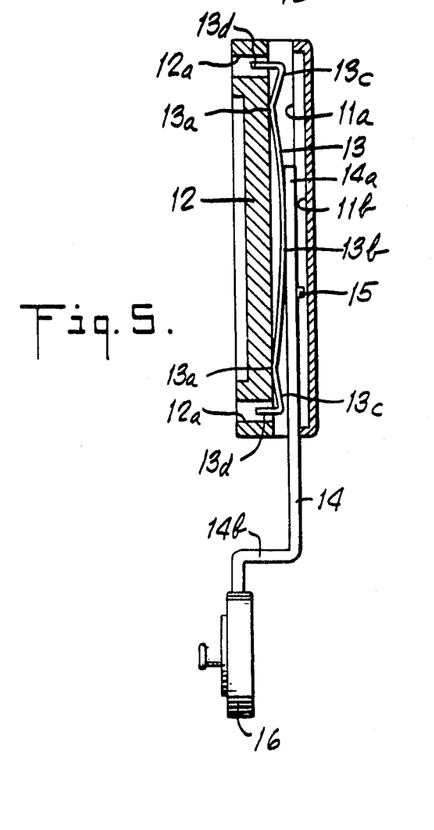
FIG. 5 is a cross-sectional view taken on the line 5—5 of FIG. 4.

The leaf spring 13 is of a generally sinuous contour so that it engages the inner surface of the block 12 at two spaced localities, as shown at 13a in FIG. 5, and the middle of the spring engages the opposite side of the aperture 11a at 13b. The outer side of the aperture 11a is provided with a narrow channel 11b. The ends of the channel 11b are closed by the ends of the casing 11.

A beam 14 has one end 14a slidable into the aperture 11a from either end thereof. The beam 14 carries a projection 15 on its outer surface. Projection 15 rides in the channel 11b. When the beam 14 is in place in the casing 11, it is frictionally held by the spring 13, near the middle of the aperture 11a. The projection 15 prevents movement of the beam out of the aperture beyond a range of operating positions in which it is engaged by the middle of the spring 13.

Figures 8, 9, 10, 11:
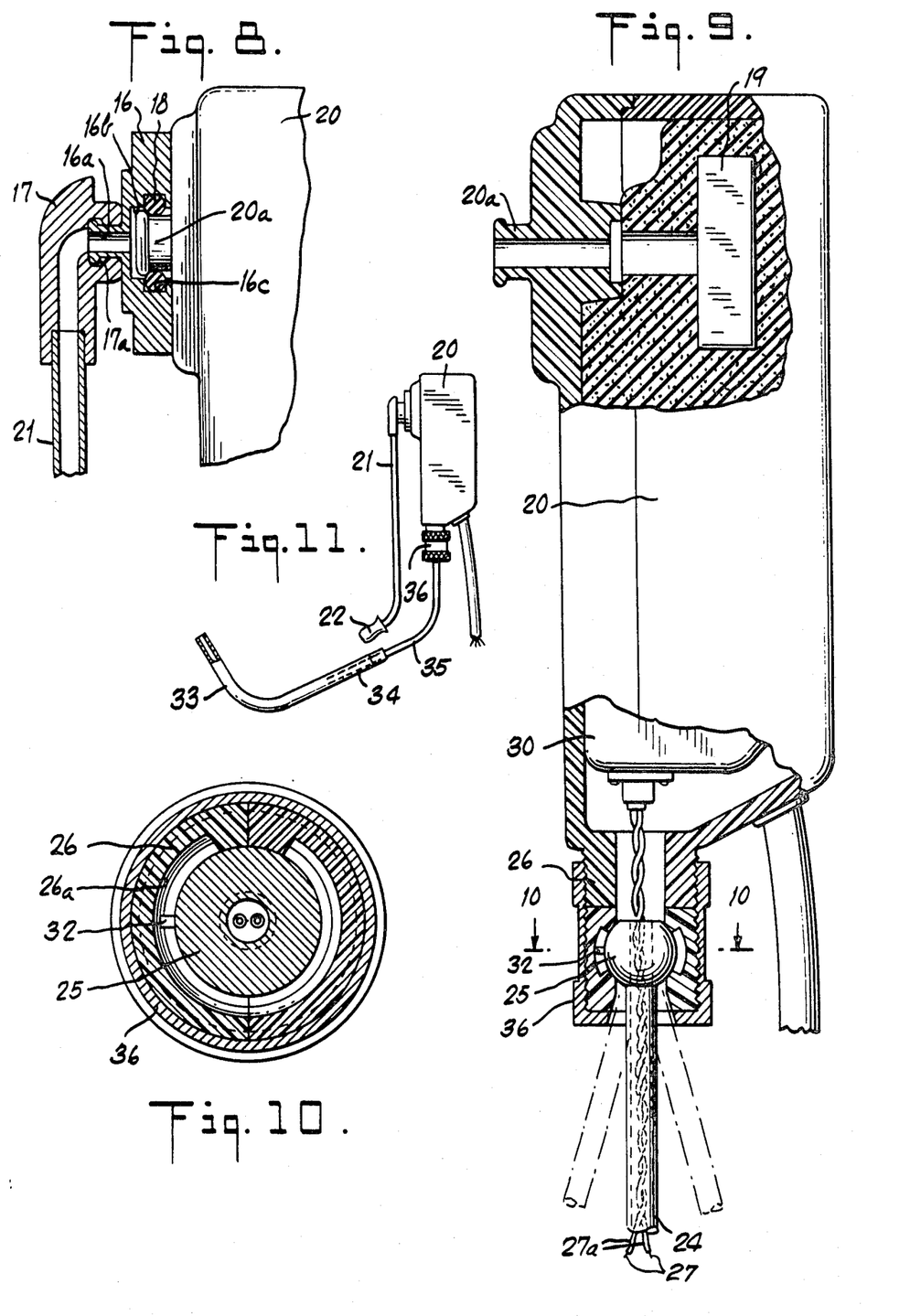
FIG. 8 is a fragmentary view on an enlarged scale, partly in elevation and partly in section, on the line 8—8 of FIG. 2.
FIG. 9 is a fragmentary view on a still larger scale, partly in section, on the line 8—8 of FIG. 2, and partly in elevation, and with certain parts removed.
FIG. 10 is a cross-sectional view on the line 10—10 of FIG. 9.
FIG. 11 is a front elevational view, similar to a portion of FIG. 1, illustrating another embodiment.
Figures 12, 13, 14, 15, 16:
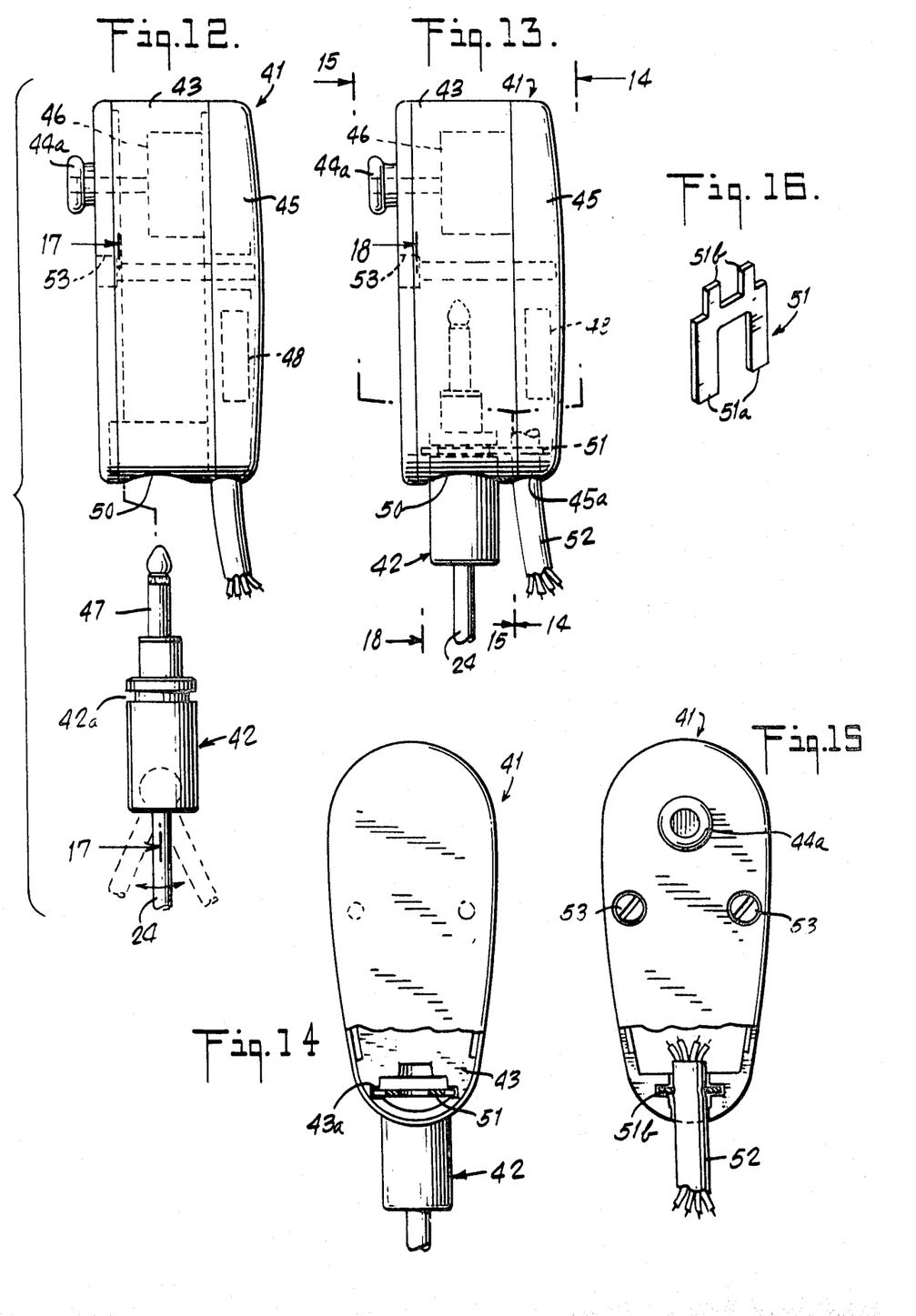

The outer end of the beam 14 has an offset 14b, and beyond the offset carries a double acoustic coupling element 16, best seen in FIG. 8. The double coupling element 16 is adapted to engage a cooperating ear tube coupler 17, and also to engage a cooperating coupling element 20a on a transducer housing 20. The double coupling element 16 has a boss 16a which cooperates with a recess 17a formed on the ear tube coupler 17. The double coupling element 16 also has a recess 16b which cooperates with the projecting coupling element 20a. An O-ring 18 is captured within a channel 16c formed in the double coupling element 16 and is effective to hold the projecting coupling element 20a in the recess 16b after the two are pushed together.

The ear tube coupler 17 is connected to an ear tube 21 having at its end an earpiece 22 (see FIG. 1) adapted to be inserted into the ear canal of the wearer. The earpiece 22, tube 21, coupler 17, double coupling element 16, and projecting coupling element 20a are provided with connecting internal passages which define an acoustic path from a transducer 19 in the transducer housing 20 to the ear of the wearer.

If the headset is of the "listen only" type, there is only the transducer 19 in the housing 20. If the headset is to be adapted for two-way communication, then a microphone 23 (FIG. 1), which may be of the reversible type shown in the copending application of Lech Poradowski, Ser. No. 592,632, filed July 3, 1975, or any other suitable microphone may be fixed on the end of a conduit 24. The other end of the conduit 24 is attached to a ball 25 of an articulated joint 25, 26 (FIG. 9) having a socket 26 integral with or attached to the transducer housing 20. Electrical conductors 27 covered by insulating sheaths 27a lead from the microphone 23 through communicating apertures in the ball 25 and socket 26 to suitable terminals 30 or other electrical apparatus in the housing 20. A cable 31 connects the terminals in the housing 20 to suitable external circuitry. The ball and socket joint 25, 26 permits rotation of the conduit 24 at least 180° about the vertical axis of the socket 26, as viewed in FIG. 9, so that the microphone may be used on either the left or right side of the wearer's head. Furthermore, the ball and socket is constructed to permit tilting of the conduit at least 15° about any axis in the plane perpendicular to the vertical axis of the socket 26.

Figure 6:
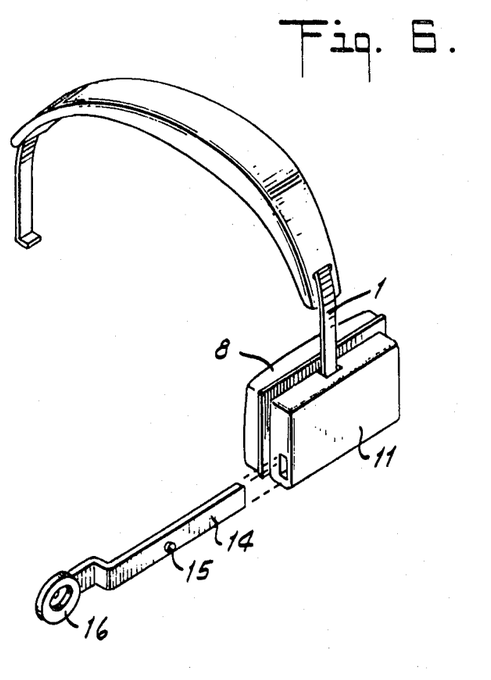
FIG. 6 is an exploded fragmentary, perspective view showing how the beam in the headset of FIG. 1 is assembled when the earphone is to be used at the wearer's left ear.

When the headset is in use on the left-hand side of the wearer's head, the beam is assembled on the casing 11 in the manner shown in FIG. 6, so that the transducer housing 20 is located forwardly of the wearer's ear. The flexible ear tube 21 may be formed as required to bring the earpiece 22 into alignment with the wearer's ear. The microphone 23 may be adjusted by sliding the beam 14 in or out and by moving the parts of the articulated joint 25, 26 to bring the microphone close to the left corner of the wearer's mouth.

Figure 7:
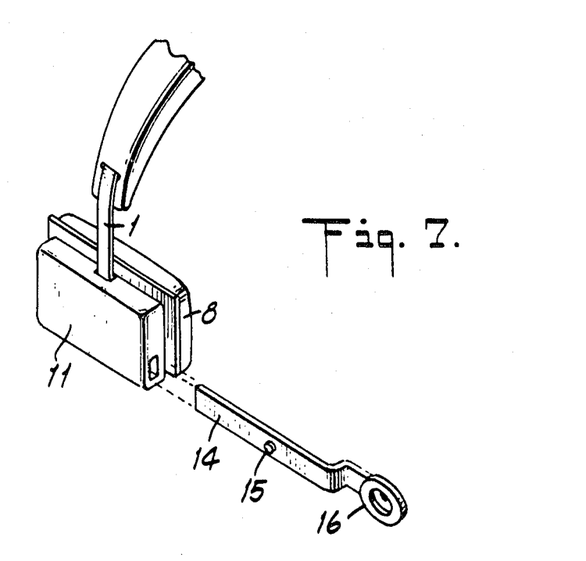
FIG. 7 is a fragmentary view similar to FIG. 6, showing how the headset is assembled when the earphone is to be used at the wearer's right ear.

If it is desired to wear the headset with the earpiece 22 in the right ear of the wearer, then the beam 14 is assembled on the casing 11 as illustrated in FIG. 7. The coupling between the transducer housing and the beam allows the transducer housing to be rotated so that it depends from the beam on either side of the wearer's head. The conduit 24 may now be rotated on the articulated joint to bring the microphone 23 into position adjacent the right-hand corner of the wearer's mouth. Since the microphone may receive sound through either of its two major faces, it does not matter which of those two faces is nearest the wearer's mouth.

The offset 14b (FIG. 5) is effective to bring the double coupling element 16 and hence the transducer housing 20, the ear insert 22 and the microphone 23 closer to the wearer's head than the slidable end 14a of the beam.

The ball 25 of the articulated joint is provided with a projection 32, which moves in a recess 26a formed in the socket 26. The ends of the recess 26 limit the rotation of the ball to an angle less than 360°, and preferably somewhat greater than 180°. This limitation of angular movement prevents the wires 27 from getting excessively twisted due to successive readjustments of the microphone position.

FIG. 11

Figure 1:
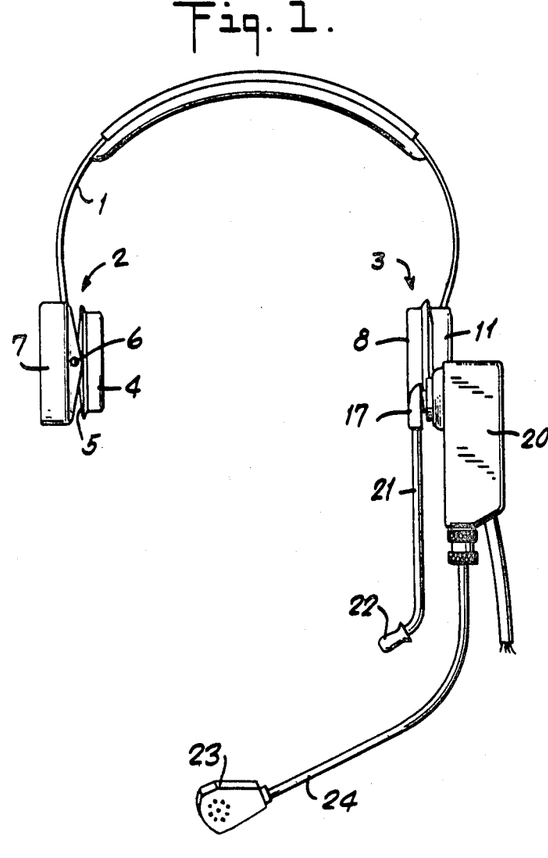
FIG. 1 is a front elevational view of a headset embodying the invention.
Figure 2:
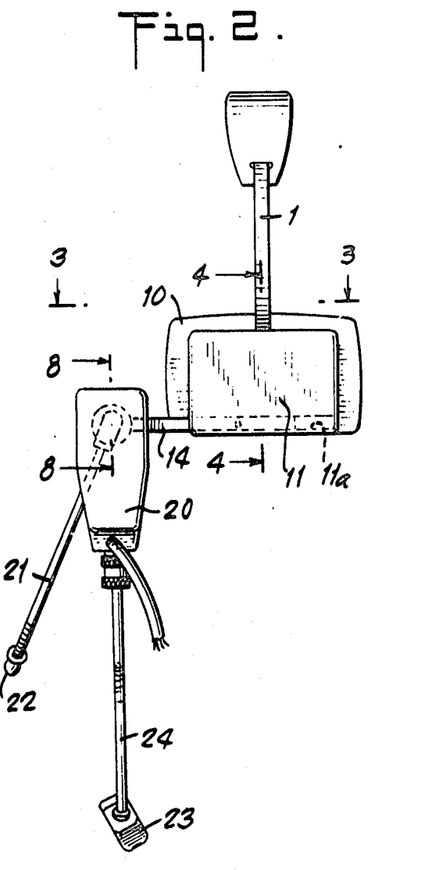
FIG. 2 is a right side elevational view of the headset of FIG. 1.
Figure 3:
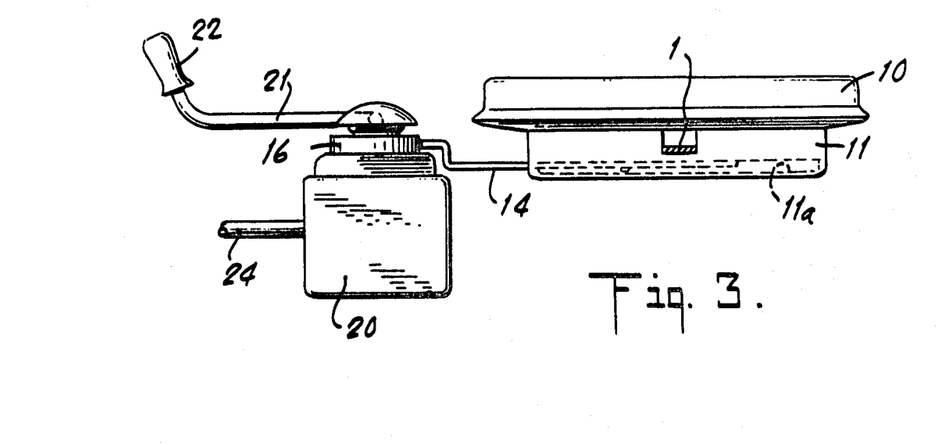
FIG. 3 is a cross-sectional view taken on the line 3—3 of FIG. 2, on an enlarged scale.
Figure 4:
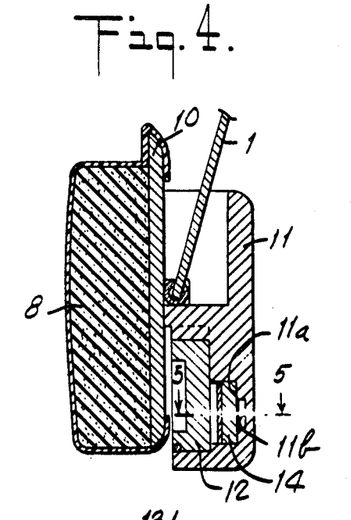
FIG. 4 is a cross-sectional view taken on the line 4—4 of FIG. 2, on an enlarged scale.

In this embodiment, the microphone 23 and tube 24 of FIG. 1 are replaced by an acoustic tube 33 connected through a telescope coupling 34 and another acoustic tube 35 to an articulated joint 36. In this embodiment, the microphone is located in the housing 20, and the sound is conveyed through the acoustic path 33, 34, 35, 36 to the microphone.

It is, of course, possible to adapt either of the headsets illustrated for use as a microphone only headset, by omitting the ear tube and the earphone transducer 19. Alternatively, either headset may be adapted for use as an earphone only headset by omitting the microphone 23 and tube 24 in that embodiment of FIG. 1 or by omitting the acoustic tube 33, 35 and the microphone in the embodiment of FIG. 11.

Although the headsets illustrated employ a single earphone, it should be readily apparent that they can be adapted to use dual earphones by duplicating the pad means 3 and the associated earphone parts on both ends of the yoke 1. Such a dual earphone headset is reversible as to the left or right-hand location of the microphone, in the same manner as the single earphone headsets illustrated.

I claim:
1. A reversible headset comprising:
 a. headband means for supporting the headset on a wearer's head, including a pad adapted to engage either side of the head and having an aperture extending therethrough from front to back and open at both ends so that when said headband means is on a wearer's head, there is always a front opening aperture in the pad, whether the pad is on the left or right side of the head;
 b. beam means having one end slidable into either end of said aperture so that when said one end of the beam means is inserted in the front end of the aperture, the other end of the beam means projects forwardly from the pad;
 c. transducer housing means mounted on the forwardly projecting beam means;
 d. an earphone transducer within the housing means; and
 e. ear tube means having one end adapted to engage an ear of the wearer and defining an acoustic path between the ear and the transducer;
 f. said headset being reversible from a first configuration in which the ear tube means is adjacent one of the wearer's ears to a second configuration in which the ear tube means is adjacent the other of the wearer's ears by removing the beam means from one end of the aperture and inserting it in the opposite end of the aperture.

2. A headset as in claim 1, in which said headband means includes:
 a. a yoke adapted to fit over a wearer's head; and
 said pad means and a second pad means, respectively located at the opposite ends of the yoke and adapted to engage the opposite sides of the wearer's head, said aperture extending through one of said pad means.

3. A headset as in claim 2, in which:
 a. said one pad means includes an elongated leaf spring biasing the beam means against one side of the aperture to hold it frictionally in place therein.

4. A headset as in claim 3, in which:
a. said beam means is adjustable lengthwise of the aperture;
b. said spring is elongated and engages the middle of said one side of the aperture when there is no beam means in the aperture; and
c. said beam means in any operating position within the aperture is engaged by the middle of the spring and held frictionally against said one side of the aperture.

5. A headset as in claim 4, in which said spring has tips bent over to engage the housing, so as to prevent end-wise movement of the spring through the aperture.

6. A headset as in claim 3, including:
a. a projection on the side of the beam means opposite the spring; and
b. a channel in the housing receiving the projection, said channel being closed at its ends to engage the projection and thereby prevent a movement of the beam means out of the aperture beyond a range of positions in which it is engaged by the middle of the spring, said beam means being removable from the aperture by compressing the spring so that the projection clears one of said closed ends.

7. A headset comprising:
a. headband means for supporting the headset on the wearer's head, said headband means including a yoke adapted to extend transversely over the wearer's head and a casing connected to one end of the yoke;
b. beam means projecting forwardly from said casing;
c. transducer housing means mounted on the projecting beam means;
d. an earphone transducer within the housing means;
e. ear tube means; and
f. means defining an acoustic path between the ear tube means and the earphone transducer, said acoustic path defining means comprising:
  1. an acoustic tube connecting the earphone transducer and an opening in the housing means;
  2. a first rotatable coupling between the housing means and the projecting end of the beam means, said coupling including a first element on the housing means and encircling the opening, and a second element on the beam means cooperating with the first element;
  3. a second rotatable coupling between said projecting end of the beam means and the ear tube means, said first and second couplings having connecting apertures forming part of said acoustic path.

8. A headset as in claim 7, in which each of said couplings comprises cooperating separable male and female elements and means resisting coupling and separation of said elements.

9. A headset as in claim 7, in which one of the couplings comprises:
a. an aperture in one side of the beam means and extending part way through the beam means;
b. said other coupling comprises a projection concentric with said aperture and on the other side of the beam means, and an opening through said projection into said aperture.

10. A headset as in claim 8, in which the resisting means of one of said couplings comprises an O-ring captured in a recess in the wall of the last-mentioned aperture.

11. A headset as in claim 8, in which the resisting means of one coupling comprises an inward projection on the wall of the female element and an outward projection on the wall of the male element, said elements being of yieldable material, so that the projections can snap over one another during insertion and removal.

12. A headset as in claim 1, including an offset on the beam means between said one end and said other end to bring the other end closer to the wearer's head than the one end.

13. A headset as in claim 1, including:
a. a microphone;
b. articulated joint means supported on said housing means;
c. a conduit having one end connected to the articulated joint, said conduit being curved so that the microphone is disposed laterally of the housing means;
d. conductor means connected to the microphone and extending through the conduit and the joint into the housing; and
e. means including the conduit and the joint supporting the microphone for adjustment of its operating position with respect to the wearer's mouth.

14. A headset as in claim 13, in which:
a. said microphone is reversible;
b. said conduit is curved sufficiently to support the microphone adjacent the wearer's mouth when the headset is in place on the head;
c. said joint permits rotation of the conduit at least 180° about its own axis to allow the microphone to be used on either the left or the right-hand side of the head.

15. A headset as in claim 13, in which said joint permits tilting of the conduit at least 15° about any axis perpendicular to the conduit to adjust the position of the microphone relative to the mouth.

16. A reversible headset comprising:
a. headband means for supporting the headset on a wearer's head, said headband means having an aperture extending horizontally therethrough, parallel to a head engaging surface thereof;
b. beam means having one end slidable into either end of said aperture, so that the beam means may be mounted with its other end extending forwardly from said headband means on either side of the head;
c. housing means supported on the other end of the beam means;
d. a reversible microphone having sound receiving openings on two opposite faces;
e. articulated joint means supported on said housing means;
f. a conduit having one end connected to the microphone and the other end connected to the joint, said conduit being curved so that the microphone is disposed laterally of the housing means;
g. conductor means connected at one end to the microphone and extending through the conduit and the joint into the housing means; and
h. means including the conduit and the joint supporting the microphone for adjustment of its operating position with respect to the wearer's mouth on either the left or right-hand side of the head.

17. A headset as in claim 16, in which:
a. said conductor means comprises continuous wires connected to the microphone, and extending through the conduit to terminals in the housing means; and b. said joint includes means limiting rotation of the conduit on the housing means to less than one revolution.

18. A headset comprising:

a. headband means for supporting the headset on the wearer's head, said headband means including a yoke adapted to extend transversely over the wearer's head and a pad connected to one end of the yoke;

b. beam means projecting forwardly from said pad and having a passage extending through its forward end;

c. transducer housing means mounted in said passage and supported by the beam means;

d. an earphone transducer within the housing means;

e. ear tube means supported by the beam means; and f. means defining an acoustic path from the earphone transducer through said passage to the ear tube means.

19. A headset as in claim 18, including:

a. a microphone in said housing;

b. acoustic tube means extending between the wearer's mouth and the microphone, said acoustic tube means including an articulated joint connecting the tube and the housing, said joint permitting rotation and tilting of the tube with respect to the housing.

20. A headset as in claim 18, comprising:

a. a microphone;

b. a conduit supporting the microphone and extending therefrom to the housing; and c. an articulated joint connecting the conduit and the housing, said joint permitting rotation and tilting of the conduit with respect to the housing.

* * * * *

UNITED STATES PATENT OFFICE
CERTIFICATE OF CORRECTION

Patent No. 3,971,901                    Dated July 27, 1976

Inventor(s) James P. Foley

It is certified that error appears in the above-identified patent and that said Letters Patent are hereby corrected as shown below:

On the Title Page, line 15, after heading "ABSTRACT", "boom" should read -- beam --.

Figs. 12 to 21 of Drawings should be cancelled.

Col. 4, line 59, -- b. -- should be added before "said".

Col. 5, line 31, -- b. -- should be added before "beam".

Signed and Sealed this

Twenty-third Day of November 1976

[SEAL]

Attest:

RUTH C. MASON
Attesting Officer

C. MARSHALL DANN
Commissioner of Patents and Trademarks